United States Patent [19]

Visa et al.

[11] 4,058,231
[45] Nov. 15, 1977

[54] APPARATUS FOR MOVING AN EXCHANGEABLE PLATFORM OR A CONTAINER ON TO AND OFF OF A TIPPING FRAME OF A LORRY, TRAILER, OR THE LIKE

[75] Inventors: Heikki Visa, Vanhalinna; Ossi Rantala, Lietsala; Antti Risti, Loimaa, all of Finland

[73] Assignee: Autolava Oy, Raisio, Finland

[21] Appl. No.: 606,516

[22] Filed: Aug. 21, 1975

[51] Int. Cl.² .............................................. B60P 1/64
[52] U.S. Cl. ............................... 214/516; 214/505; 294/82 R; 298/15; 298/20 R
[58] Field of Search ............... 214/505, 508, 516, 517; 294/82 R, 78 A; 298/15, 20 R, 16

[56] References Cited
U.S. PATENT DOCUMENTS

| | | | |
|---|---|---|---|
| 2,697,530 | 12/1954 | Claessens | 214/516 |
| 3,217,914 | 11/1965 | Aldropp | 214/516 |
| 3,472,407 | 10/1969 | Corompt | 214/505 |
| 3,841,510 | 10/1974 | Walton et al. | 214/516 |
| 3,894,644 | 7/1975 | Alexander | 214/505 |

FOREIGN PATENT DOCUMENTS 320,326  2/1970  Sweden ................................ 214/516

*Primary Examiner*—Stephen G. Kunin
*Assistant Examiner*—Charles E. Frankfort
*Attorney, Agent, or Firm*—Bierman & Bierman

[57] ABSTRACT

Method and apparatus for unloading a platform from a lorry having a tipping frame, the tipping frame having an endless belt or chain which in turn has an elongated chain connected thereto. The chain has hook and wedge member thereon adapted to connect to pull bars on the platform to lift the platform onto the lorry. For lowering, a counter element is provided on the endless belt or chain for pushing the platform off the lorry.

6 Claims, 13 Drawing Figures

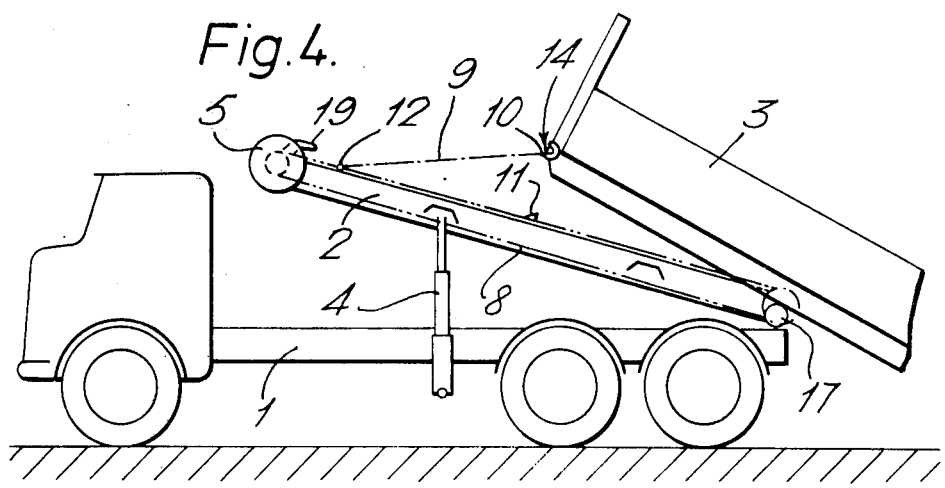
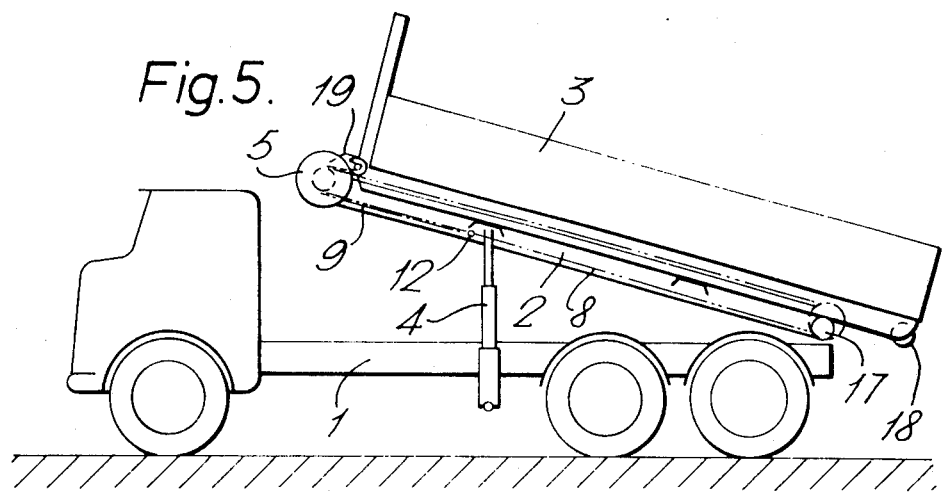
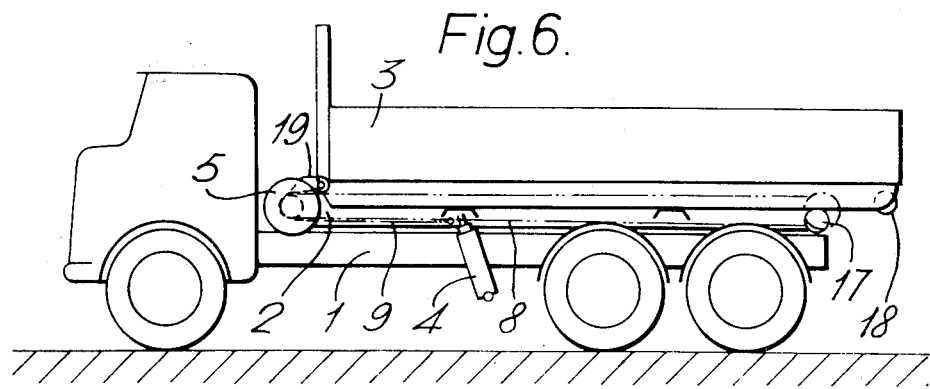

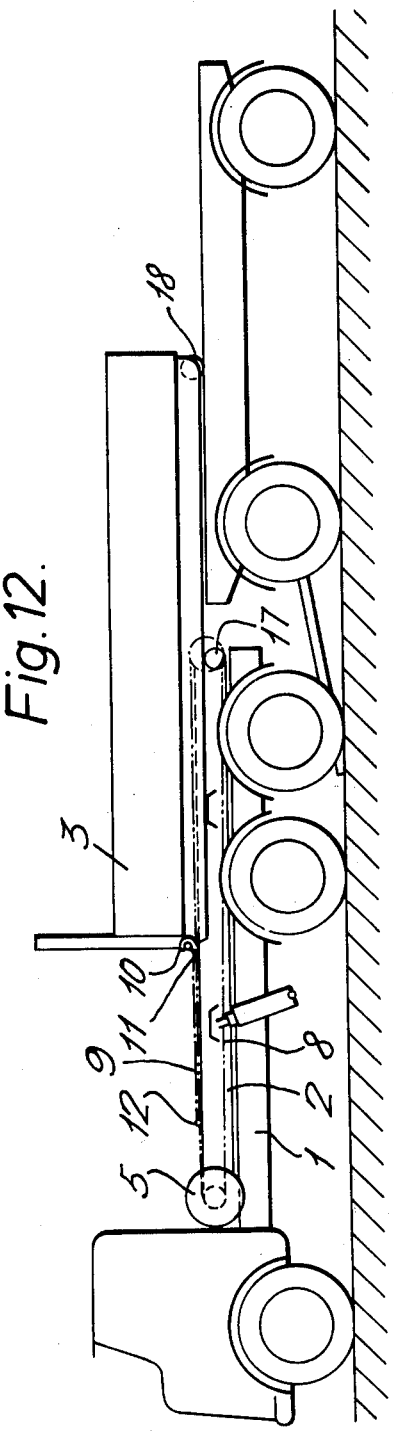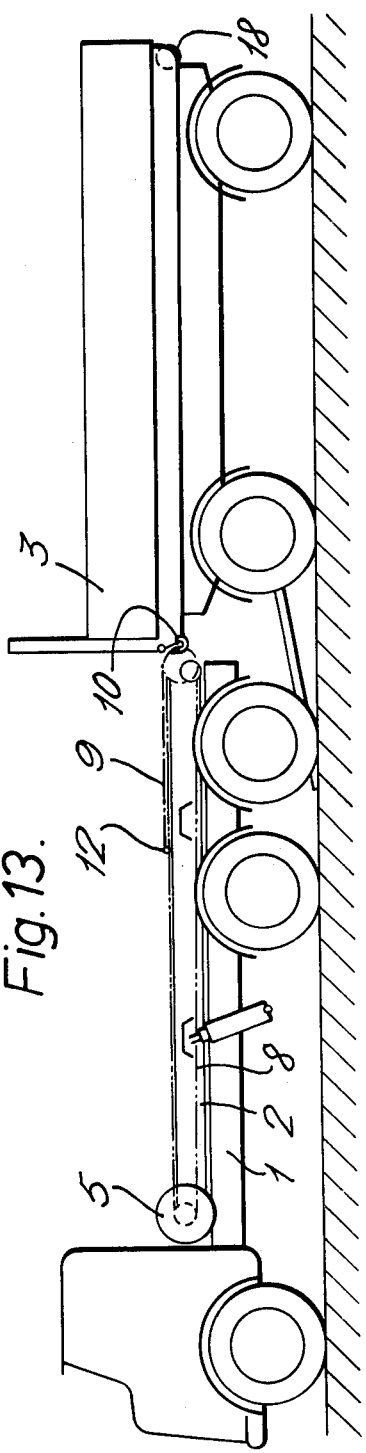

APPARATUS FOR MOVING AN EXCHANGEABLE PLATFORM OR A CONTAINER ON TO AND OFF OF A TIPPING FRAME OF A LORRY, TRAILER, OR THE LIKE

This invention relates to loading or unloading an exchangeable platform or a container on to or off the tipping frame of a lorry, trailer or the like, the tipping frame being provided with one or more endless elements, such as chains or cables, running around one or more wheels arranged at each end of the tipping frame.

It has been proposed to load an exchangeable platform on to a tipping frame by means of two wire drums arranged on the shaft of a hydraulic motor mounted at the front end of the tipping frame, for instance, and by means of two wires running from the drums. It has also been proposed to use different kinds of travelling claw structures. However, these proposals require that the tipping frame can be, besides being tilted, also moved down rearwards so far that its rear end contacts the ground or other base on which the platform or the container rests.

An object of this invention is to provide a simple means for loading or unloading an exchangeable platform or a container.

The method according to the invention is mainly characterized in that the exchangeable platform is pulled on to the tipping frame by means of an elongated element attached at one end to an endless element, and provided with an engaging member at its other end for engaging the platform, and that the platform or the container is pushed off from the tipping frame by means of the engaging element with the engaging element being prevented from moving towards the attachment of the elongated element to the endless element by means of a counter element mounted on the endless element.

The invention also provides apparatus for loading or unloading an exchangeable platform or the like onto or off the tipping frame of a vehicle including a tipping frame operated by cylinder-piston devices for tilting the tipping frame into an inclined position, the tipping frame being provided with an endless element guided on wheels arranged at each end of the tipping frame, means being provided for moving the endless element, characterized in that an elongate element for pulling an exchangeable platform on to the tipping frame is attached at one end to the endless element, the free end of the elongate element being provided with an engaging member for engaging member the platform, and that the engaging member is prevented from moving towards the attachment point of the elongated element to the endless element by means of a counter element, attached to the endless element, when the exchangeable platform is unloaded from the tipping frame.

When the endless element on a tipping frame is according to this invention provided with an elongate element having an engaging member, only a simple fastening means is required on platforms.

Since the fastening means may be low at the end of a platform, the platform structure can be made as simple and as light as required.

The device according to the invention makes it possible to load or unload a platform without outside help and without the driver leaving the cab. By means of the apparatus according to the invention, a platform can also be pushed from the tipping frame to a trailer or to a loading bridge. In this event, the platform can be pushed by means of a special pushing bar, arranged at the rear end of the tipping platform, further than by means of the elongate element only. The engaging member, such as a hook, at the end of the elongated element, is shaped so that it is self-positioning even at a certain sideways deviation, and prevents a partial, one-sided engagement if the sideways deviation is too great.

The invention is further illustrated in the following description which refers to the accompanying drawings, in which:

FIGS. 1 – 6 show schematical side views of an apparatus according to the invention, in different stages of loading an exchangeable platform on to a tipping frame.

FIGS. 12 and 13 show the moving of an exchangeable platform on to a trailer and off from it by means of a device according to the invention.

Figure 1:
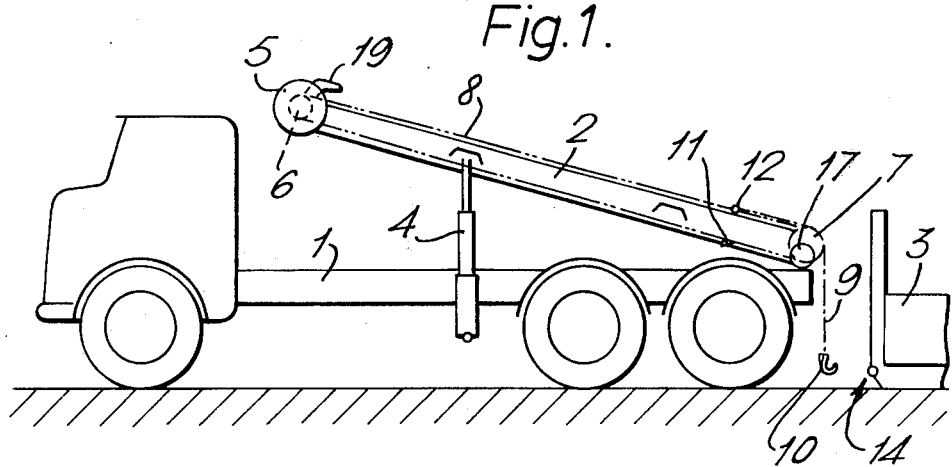

As shown in FIGS. 1 – 6, a tipping frame 2 is arranged on the chassis 1 of a lorry and it can be tilted into a position inclined rearwards by means of cylinder-piston devices 4 (one only shown). A transverse shaft is mounted at the rear ends of the chassis beams 1. Rolls 17 with guiding flanges on their outer edges are mounted at the ends of the transverse shaft. In the case illustrated, the tipping frame 2 is made fairly narrow. A chain or cable wheel 6 is arranged at the front end of the tipping frame on a transverse shaft which is driven by a hydraulic motor 5, a wheel 7 is arranged at the rear end of the tipping frame, and an endless element, chain or cable 8 is arranged to run around the wheels 6 and 7. A tightening section is arranged at a suitable point on the endless chain or cable 8 for tightening the chain or cable to a suitable tightness. A tail or elongated element 9 is attached at one end to the chain or cable 8 at point 12 and the other, free end of the tail is provided with an engaging member 10 for engaging an exchangeable platform 3 or a container. A counter element 11, such as a nib or the like, is also mounted on the chain or cable 8 behind the fastening point 12 of the tail 9 at a distance substantially corresponding to the length of the tail 9. When the tail 9 is pulled on to the chain or cable 8, the counter element 11 takes a position against a corresponding counter surface or element of the engaging member 10, so that unintended movement of the engaging member 10 towards the fastening point 12 of the tail 9 is prevented.

Figure 11:
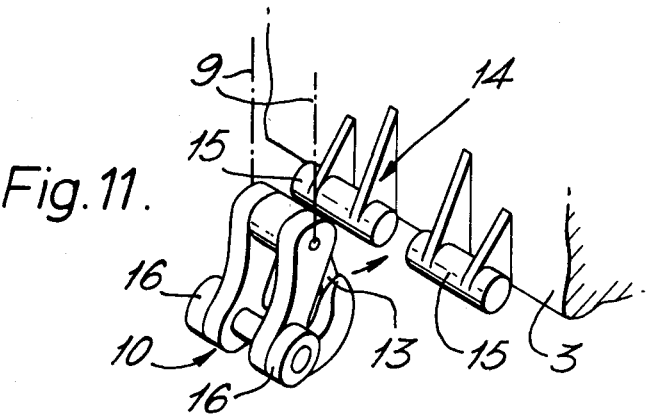
FIG. 11 shows a perspective view of the engaging member and the fastening means at the front section of the exchangeable platform.

The tail 9 is formed for instance by two chains or cables side by side with a spacing between them and connected to each other such as is shown in FIG. 11. The cross section of the tail is substantially U-shaped so that the tail stays on the chain or cable 8. When the tail 9 is shaped as described above, the endless chain 8 and the tail 9 are positioned along the same pulling line and the chain 8 and the tail 9 also run on the front chain wheel 6 and on the rear wheel 7 so that the chain and the tail have the same radius.

A preferred engaging member is a hook 10 shown in FIG. 11. The front edge of the hook is provided with an upright wedgelike part 13 for positioning the hook.

FIG. 11 also shows the construction of a fastening means 14 for the hook 10, located at the lower section of the front edge of the platform 3. The fastening means 14 is formed by two horizontal, preferably round rods 15, parallel to the front edge of the platform 3 and mounted to the front edge thereof. Between the opposite ends of the rods there is a spacing for the wedge 13 of the hook. Preferably the opposite ends of the rods 15 are slanted in order to facilitate the positioning of the self-positioning hook into the fastening means 14.

It is also possible to arrange two or even more endless parallel chains or cables on the tipping frame 2, instead of one endless chain 8. A chain or cable can possibly be replaced by some other corresponding endless element. It is also possible to have one or several tails 9. It should be noted that the number of tails 9 need not be the same as the number of endless chains or cables 8 or the like. For instance, one tail can be connected to two chains.

Following is a description of the functioning of a device according to the invention.

Figure 2:
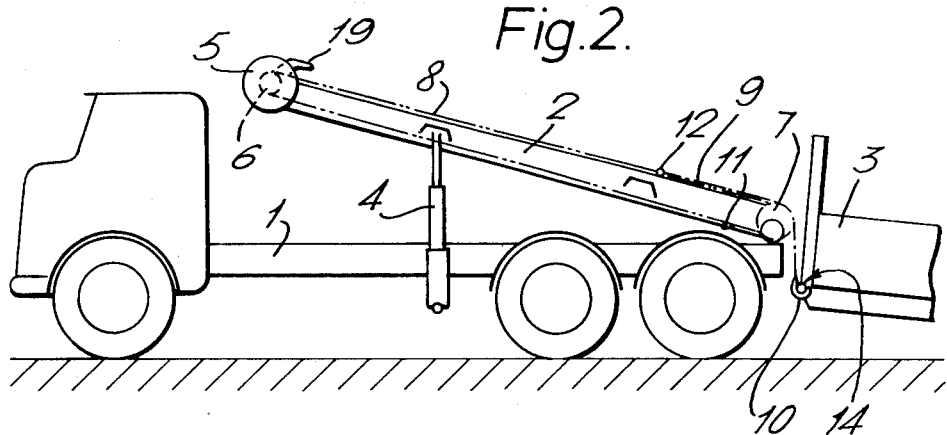
Figure 3:
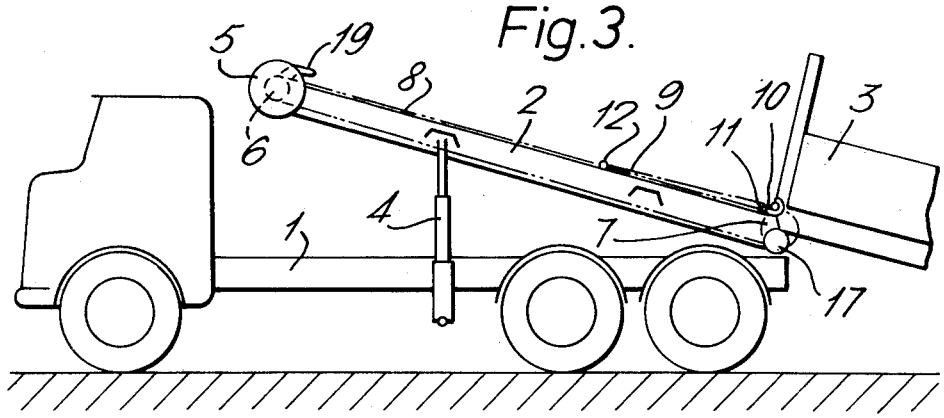
Figure 7:
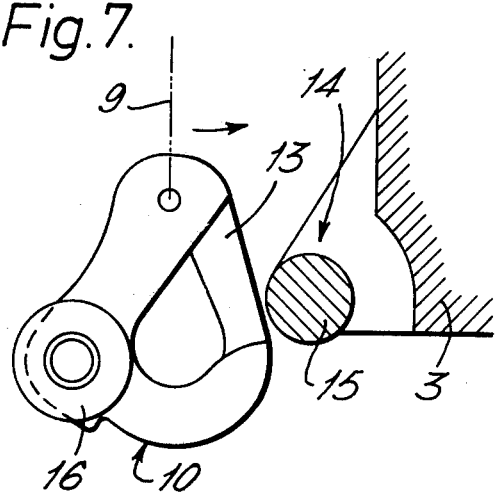
FIGS. 7 – 10 show schematical side views of an engaging member in different stages of engagement to a fastening means at the front section of an exchangeable platform.
Figure 8:
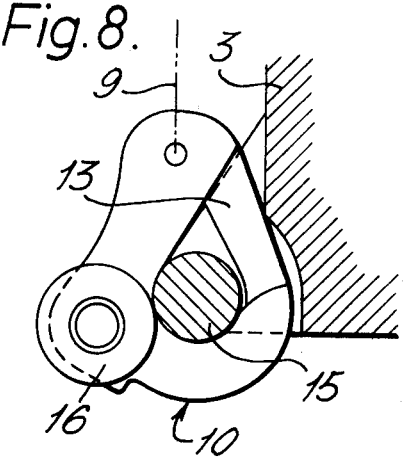

In FIG. 1, the tipping frame 2 is tilted to an inclined position, and the tail 9 is lowered rearwards down to the ground surface or near to it, by means of the endless chain 8. Then the lorry is reversed so that the engaging member 10 takes a position in the fastening means 14 in the lower section of the front edge of the platform 3. The positioning of the engaging member 10 to the fastening means 14 can best be seen in FIGS. 7, 8 and 11. In FIG. 2, the engaging member 10 is already engaged, and the hydraulic motor 5 has been started and the platform is being pulled on to the tipping frame by means of the endless chain 8 and the tail 9.

The front edge of the platform 3 is raised on to the tipping frame 2 supported all the time by the engaging member 10, even when the engaging member 10 is turned around the wheel 7. The platform 3 rests on the supporting rolls 17 only when the platform is pulled further on to the tipping frame 2. Due to this, it is not necessary to make the front ends of the bottom beams of the platform curved or shaped otherwise in a certain way. The beams can be cut vertically, for instance, at the front edge of the platform. The rear end of the platform 3 is provided with rolls 18 for facilitating the pulling of the platform 3 on to the tipping frame 2.

Figure 9:
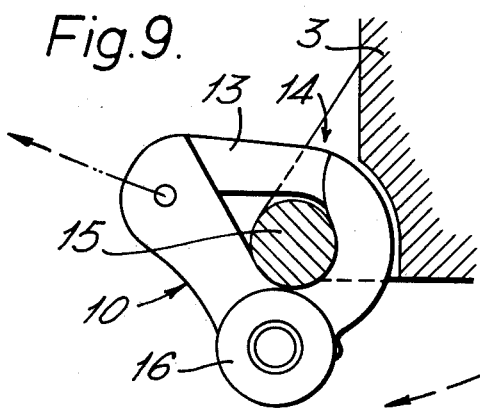
Figure 10:
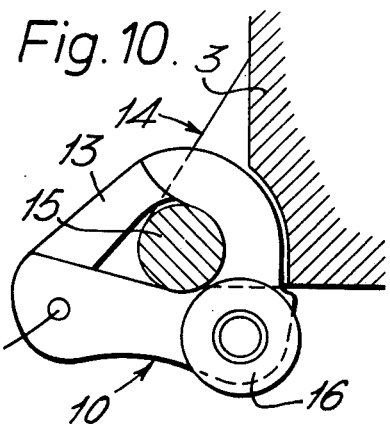

FIGS. 9 and 10 show the engaging member being pulled around the wheel 7. The engaging member 10 is provided with two supporting rolls 16, one on each side, so that when the exchangeable platform 3 is pulled on to the tipping frame 2 by means of the engaging member 10, the engaging member 10 runs on the tipping frame resting on the supporting rolls 16.

In FIG. 4, the platform 3 is pulled further upwards, and the bottom beams of the platform 3 now rest on the supporting rolls 17. In FIG. 5, the platform 3 has been pulled right to the front section of the tipping frame 2 so that the rods 15 of the fastening means 14 are positioned in a locking element 19. The fastening means of the platform 3 thus acts as a locking element when the platform 3 is on the tipping frame.

The platform 3 is removed from the tipping frame in the order opposite to the above. The tipping frame 2 is first tilted to an inclined position, after which the exchangeable platform 3 is pushed rearwards by means of the hydraulic motor 5 and the endless chain 8.

The counter element 11, such as a nib or the like, takes a position in front of the engaging member 10 when the platform 3 was pulled on to the tipping frame. When the platform 3 is unloaded, the counter element 11 pushes the engaging member 10 in front of it, and through the engaging member, also the platform 3.

It is to be noted that when the platform 3 is being removed from the tipping frame, the tipping frame has to be sufficiently tilted so that the front edge of the platform is not raised as in FIG. 4 but the counter element 11 is all the time in a steady contact with the engaging element 10.

FIGS. 12 and 13 show the exchangeable platform being moved from the tipping frame on to a trailer. The moving is performed in the same way as described above. In the same way, the platform can be moved also on to a loading bridge or other base. If the platform 3 should be pushed further on the trailer or a loading bridge, this is not possible by means of the tail 9 only. The platform 3 has to be pushed further from the position shown in FIG. 13 by means of a pushing bar in the rear section of the chassis, for instance.

According to the invention, the engaging member is shaped so that when it is turned through an angle of 45° - 90°, it locks the pulling element in the platform 3, due to its shape and also the force applied by the weight of the tail against the engaging member. Thus, the engagement member cannot get disengaged from the fastening means 14, for instance in the situation shown in FIG. 4, even if for some reason a pulling force would not be applied to the tail 9.

The invention is not restricted to the above embodiment and it may considerably vary in details within the scope of the claims.

Having now in detail described and ascertained our invention and the manner in which the same is to be performed, we declare that what we claim is:

1. Apparatus for loading and unloading an exchangeable platform onto and off of a tipping frame having an endless element, wheels located at each end of the tipping frame, the endless element moveably mounted on the said wheels, the improvement comprising: a flexible elongated element fixedly attached at one end thereof to the said endless element at an attachment point, the other end of said elongated element being free and having a hook-like engaging member thereon for releasably engaging said platform; said platform being provided with a fastening means on one end thereof, said fastening means having a hook receiving portion and limiting means, said limiting means being laterally spaced apart to form a space, said engaging member comprising at least one laterally spaced apart hook means and a positioning means, said hook means adapted to engage said hook receiving portion, said positioning means adapted to at least partly enter said space whereby lateral movement of said engaging member is restricted.

2. Apparatus according to claim 1 wherein said fastening means comprises a pair of horizontal rods which are spaced apart horizontally to form said space, said hook means comprising a pair of hooks spaced apart horizontally and adapted to engage said pair of rods, said positioning means located between said hooks.

3. Apparatus according to claim 1 comprising a counter element on said endless element and adapted to bear against said platform when said platform is on said frame, whereby said counter element prevents movement of said engaging member towards said attachment point during removal of said platform from said frame.

4. Apparatus according to claim 2, wherein said engaging member is pivotable on said fastening means, said engaging member being lockable to said fastening means upon pivoting of said hook means to between 45° and 90° about the said rods.

5. Apparatus according to claim 1, wherein the fastening means of the platform acts as a locking element when the platform is on the tipping frame.

6. Apparatus for loading and unloading an exchangeable platform onto and off of a tipping frame having an endless element, wheels located at each end of the tipping frame, the endless element moveable mounted on the said wheels, the improvement comprising: a flexible elongated element fixedly attached at one end thereof to the said endless element, the other end of said elongated element being free and having a hook-like engaging member thereon for releasably engaging said platform; two supporting rolls on said engaging member, one of said rolls on each side thereof, whereby said engaging member rests on said rolls on said frame when said platform is pulled onto said frame.

* * * * *